United States Patent [19]
Bergeron

[11] Patent Number: 6,132,085
[45] Date of Patent: Oct. 17, 2000

[54] TEMPERATURE SENSING OF FLOWING LIQUID

[75] Inventor: Gary D. Bergeron, Muskegon, Mich.

[73] Assignee: Therm-O-Disc, Incorporated, Mansfield, Ohio

[21] Appl. No.: 09/151,008

[22] Filed: Sep. 10, 1998

[51] Int. Cl.[7] .............................. G01K 13/02; G01K 1/14
[52] U.S. Cl. .............................................. 374/138; 374/40
[58] Field of Search ................................ 374/141, 138, 374/135, 148, 29, 40; 236/12, 13

[56] References Cited

U.S. PATENT DOCUMENTS

| | | | |
|---|---|---|---|
| 3,433,069 | 3/1969 | Trageser | 374/135 |
| 4,064,756 | 12/1977 | MacLean et al. | 374/138 |
| 4,420,738 | 12/1983 | Rehmann et al. | 374/138 |
| 4,437,084 | 3/1984 | Clayton, Jr. | 374/148 |
| 4,445,454 | 5/1984 | Martin | 374/160 |
| 4,643,350 | 2/1987 | DeSchaaf et al. | 374/147 |
| 5,050,062 | 9/1991 | Hass | 364/152 |
| 5,356,219 | 10/1994 | Tammera et al. | 374/138 |
| 5,551,630 | 9/1996 | Enoki et al. | 236/12 |
| 5,632,556 | 5/1997 | Sivyer | 374/138 |

FOREIGN PATENT DOCUMENTS

| | | | |
|---|---|---|---|
| 0585048 | 3/1994 | European Pat. Off. | 374/138 |
| 4025842 | 11/1994 | WIPO | 374/138 |

*Primary Examiner*—G. Bradley Bennett
*Assistant Examiner*—G. Verbitsky
*Attorney, Agent, or Firm*—Harness, Dickey & Pierce, P.L.C.

[57] ABSTRACT

Apparatus for sensing the temperature of a flowing liquid includes a molded plastic fitting having a stream divider extending across a liquid flow passage. A temperature sensor encapsulated in the stream divider senses the temperature of a liquid stream flowing through the passage as the stream is split to flow past the stream divider.

15 Claims, 3 Drawing Sheets

TEMPERATURE SENSING OF FLOWING LIQUID

BACKGROUND OF THE INVENTION

This application relates to the art of temperature sensing and, more particularly, to temperature sensing of a flowing liquid. The invention is particularly applicable for use in sensing the temperature of water flowing to a clothes washing machine and will be described with specific reference thereto. However, it will be appreciated that the invention has broader aspects and can be used for sensing the temperature of other flowing liquids in other environments.

The temperature of the hot and cold water supplied to a washing machine varies greatly. For example, in many geographical areas, the cold water supply often has a much lower temperature during winter than during summer. The temperature of the hot water supply varies greatly from one household to another depending on the setting of the hot water heater and the distance that the washing machine is located from the water heater. Also, there is often a difference in the flow rates of the hot and cold water. For these reasons, simply opening both the hot and cold water valves one hundred percent to supply warm water results in an actual warm water temperature that has extremely wide variations. Water that is too hot may damage certain clothes and water that is too cold may not clean effectively. In addition, the unnecessary use of excessive hot water is energy inefficient and environmentally unfriendly. Therefore, it would be desirable to have an arrangement for accurately sensing the temperature of warm water being supplied to a washing machine in order to cycle or modulate at least the hot water valve and thereby maintain a relatively constant warm water temperature.

SUMMARY OF THE INVENTION

In accordance with the present application, a stream divider is molded across the liquid flow passage of a molded plastic fitting. A thermistor is encapsulated in the stream divider for sensing the temperature of liquid flowing therepast. The change in resistance of the thermistor with temperature is sensed by an electronic control that then cycles or modulates at least the hot water value to maintain a relatively constant temperature of the liquid flowing through the fitting.

In a preferred arrangement, the stream divider is centrally located between opposite ends of the flow passage in the fitting. The stream divider also extends diametrically across the cylindrical flow passage and divides the passage into two equal areas that have a combined cross-sectional area that is between 35–65% of the cross-sectional area of the flow passage.

The stream divider preferably has somewhat of an airfoil shape to minimize turbulent flow and effectively split the flowing stream to flow around and past the stream divider in intimate contact therewith.

It is a principal object of the present invention to provide an improved fitting for sensing the temperature of liquid flowing through the fitting.

It is another object of the invention to provide an improved fitting having a stream divider extending across an internal cylindrical flow passage and with a thermistor encapsulated in the stream divider.

It is another object of the invention to provide a one-piece molded plastic fitting having a thermistor molded within a flow passage in the fitting.

DESCRIPTION OF A PREFERRED EMBODIMENT

Figure 1:
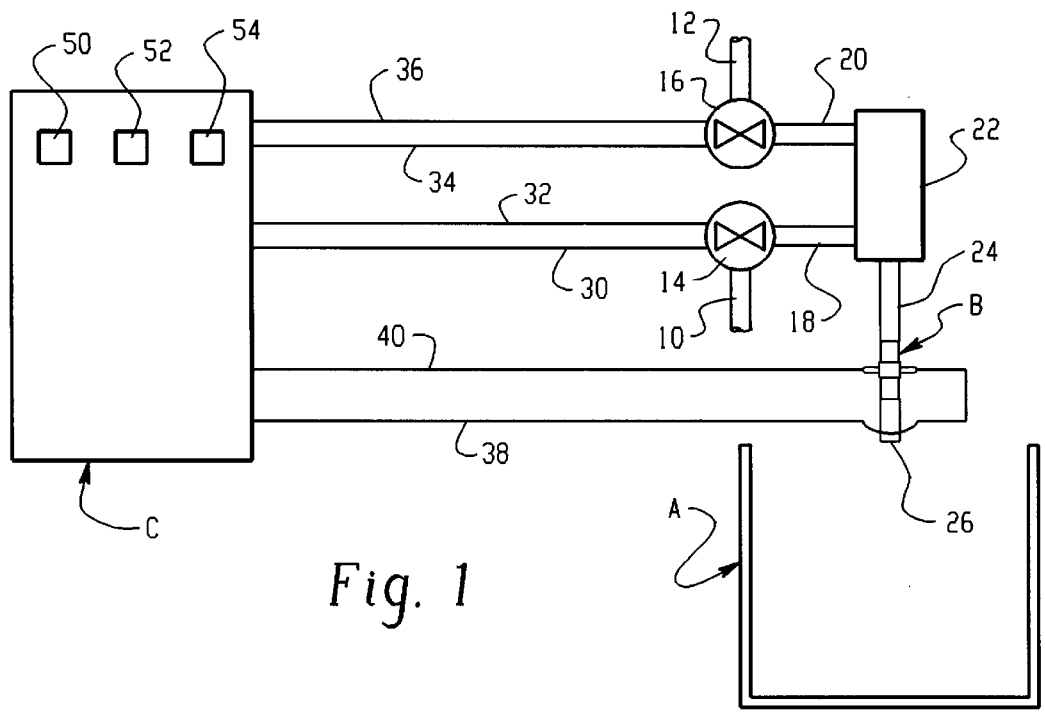
FIG. 1 is a schematic illustration of a washing machine water supply and control with the improved fitting of the present application incorporated therein.

Referring now to the drawing, wherein showings are for purposes of illustrating a preferred embodiment of the invention only and not for purposes of limiting same, FIG. 1 shows a receptacle A such as a tub for a clothes washing machine. Hot and cold water supply lines 10 and 12 are connected with motorized or solenoid operated hot and cold water supply valves 14 and 16. Hot and cold water from valves 14 and 16 is discharged through conduits 18 and 20 to a mixing chamber 22 having an outlet 24. A fitting B in accordance with the present application is connected with outlet 24 and discharges through outlet 26 into receptacle A.

An electronic control C is connected by electrical leads 30 and 32 with hot water valve 14, and by electrical leads 34 and 36 with cold water valve 16. It will be recognized that it is not always necessary to connect cold water valve 16 with electronic control C because it is possible for many purposes to regulate the temperature of water discharged from mixing chamber 22 by modulating or cycling only hot water valve 14. Electrical leads 38 and 40 connect electronic control C with a thermistor in fitting B.

Electronic control C may have manually operable buttons 50, 52 and 54 for selecting hot, warm and cold water temperatures. Selecting hot button 50 leaves cold water valve 16 closed so that all of the water supplied to receptacle A flows through hot water valve 14. Selection of cold water button 54 leaves hot water valve 14 closed so that all of the water supplied to receptacle A flows through cold water valve 16. Selection of warm water button 52 opens both hot and cold water valves 14 and 16. Only the hot water valve or both of valves 14 and 16 then are cycled or modulated by feedback signals from the thermistor within fitting B to maintain the temperature of the mixed hot and cold water at the setting in the control. The resistance of the thermistor varies with temperature and is proportional to the temperature of the water flowing into receptacle A. Electronic control C is programmed to receive signals from the thermistor and cycle or modulate the hot water supply valve or both of the water supply valves to maintain a desired temperature for the warm water.

Figure 2:
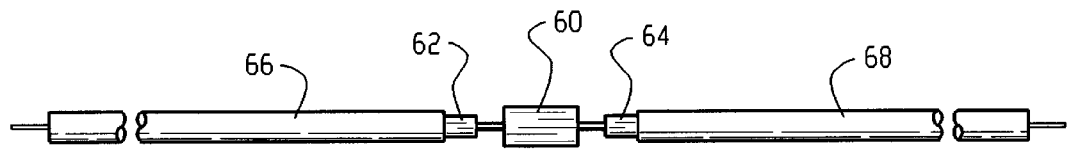
FIG. 2 is a side elevational view of a thermistor attached to a pair of electrical leads.

FIG. 2 shows a thermistor 60 having its electrical leads attached by crimp connectors 62 and 64 to electrical leads 66 and 68. Thermistor 60 may be a glass encapsulated thermistor having a negative temperature coefficient. However, it will be recognized that other types of thermistors can be used and that for some purposes thermistors having a positive temperature coefficient can be used. The thermistor provides a repeatable resistance output with temperature and the resistance is interpreted as temperature by the software in electronic control C.

Figure 3:
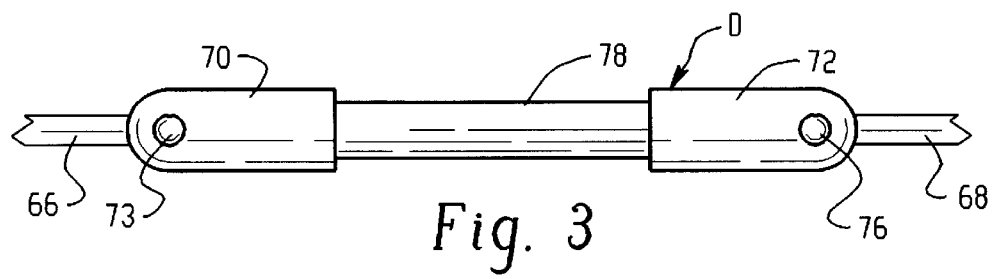
FIG. 3 is a top plan view of a chill shot of plastic material surrounding the thermistor, crimp connectors and end portions of the electrical leads to which the thermistor is attached.
Figure 4:
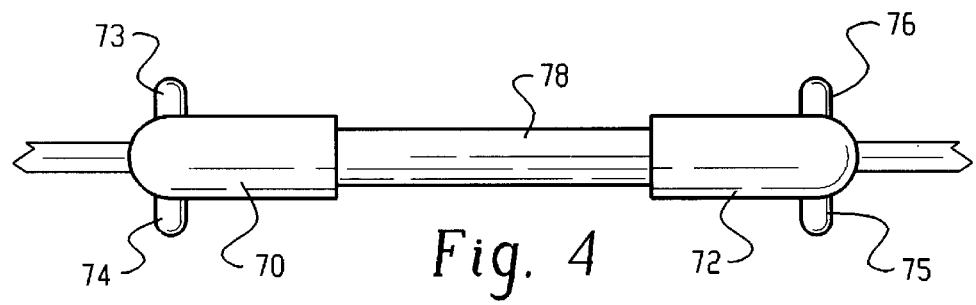
FIG. 4 is a side elevational view of the chill shot of FIG. 3.

Thermistor 60, crimp connectors, 62 and 64, and the end portions of leads 66 and 68 adjacent to crimp connectors 62 and 64 are positioned within a mold cavity. Plastic material then is injected into the mold to encapsulate the thermistor, crimp connectors and end portions of the leads within what is commonly known as a chill shot D in FIGS. 3 and 4. Chill shot D provides enlarged end portions 70 and 72 having integral locator pins 73–76 for locating the chill shot in another mold cavity used to mold fitting B. Central portion 78 of chill shot D has a reduced diameter relative to end portions 70 and 72, and is generally cylindrical.

Figure 6:
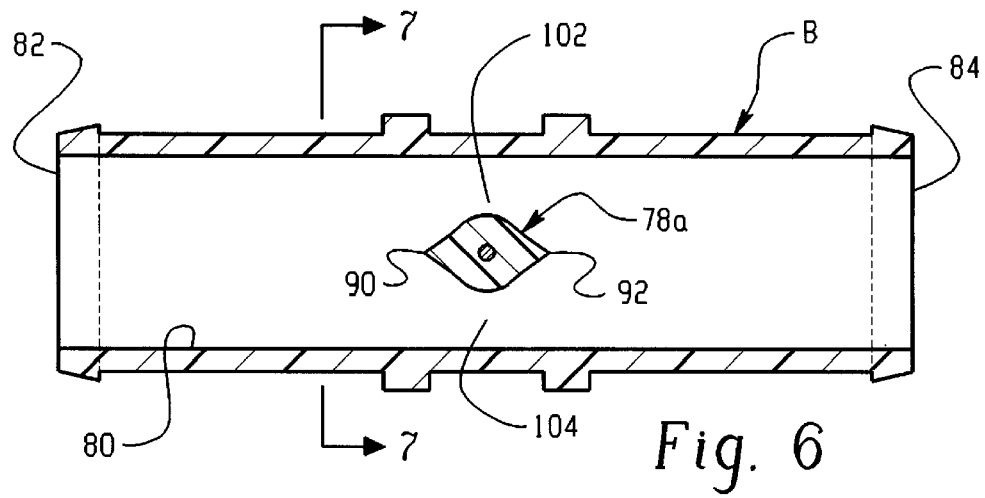
FIG. 6 is a cross-sectional elevational view taken generally on line 6—6 of FIG. 5.
Figure 9:
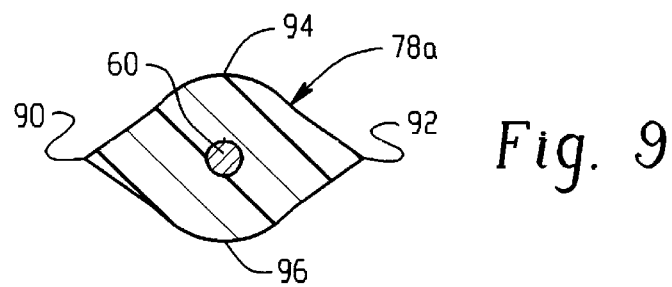
FIG. 9 is a partial cross-sectional elevational view taken generally on line 9—9 of FIG. 8 and with portions omitted to show only the stream divider.

When chill shot D is integrally molded into fitting B, additional plastic material is molded around central portion 78 to make it larger and with somewhat of an airfoil configuration as generally indicated at 78a in FIGS. 6 and 9.

Figure 5:
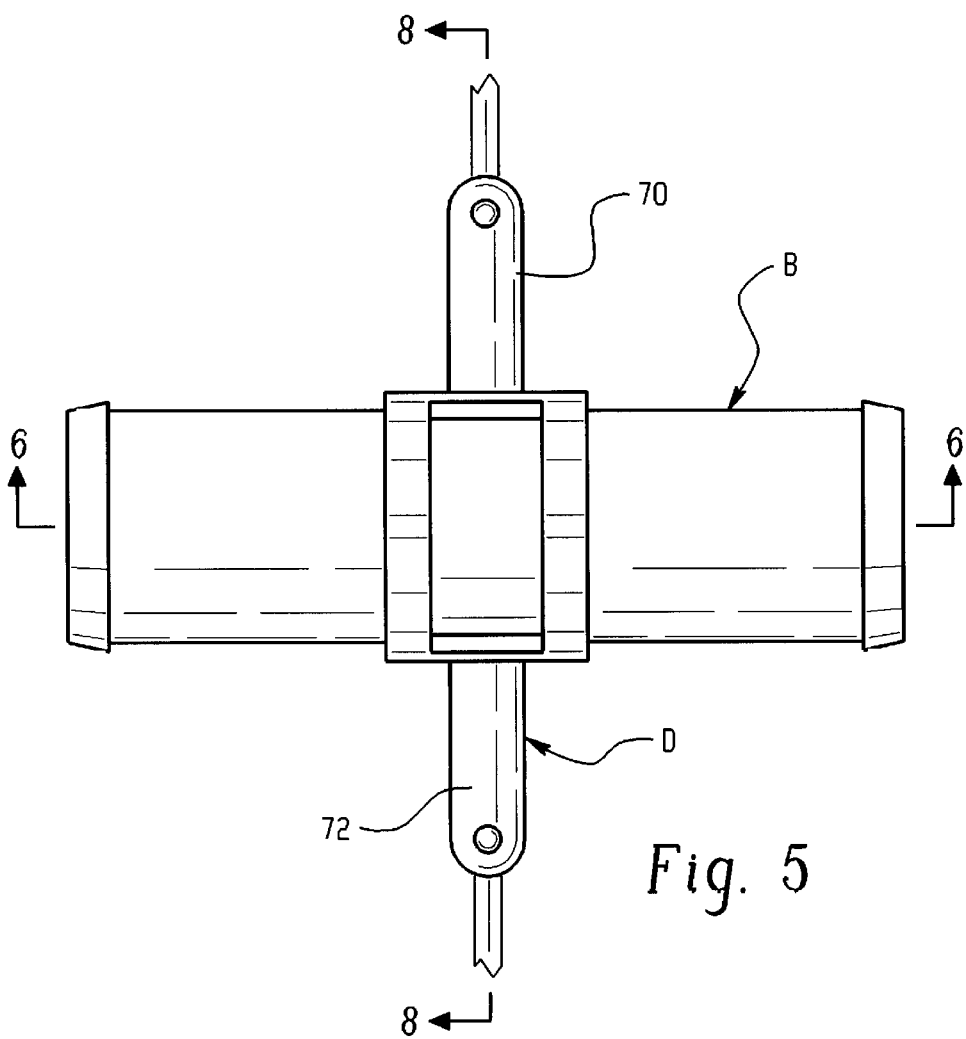
FIG. 5 is a top plan view of a molded plastic fitting constructed in accordance with the present application.

Fitting B, as shown in FIGS. 5 and 6, has a cylindrical liquid flow passage 80 therethrough and opposite ends 82 and 84. The generally airfoil-shaped member 78a in which the thermistor is encapsulated now becomes a stream divider that splits a liquid stream flowing through passage 80. Stream divider 78a is centrally located between opposite ends 82 and 84, and also lies on the diameter of passage 80.

Figure 7:
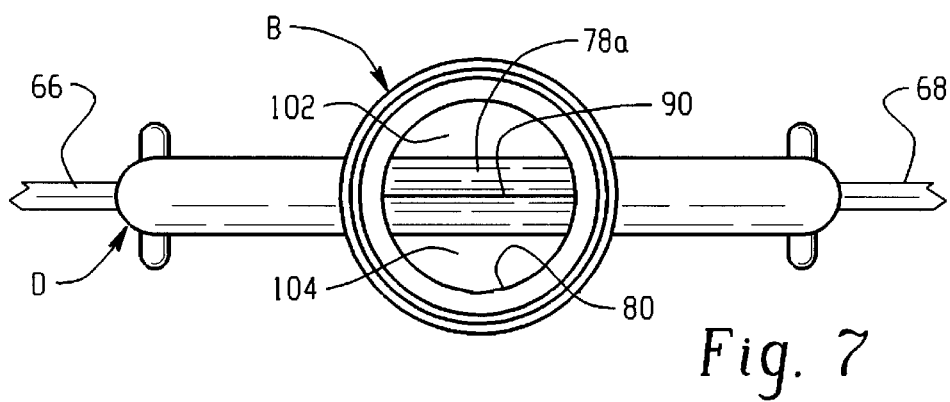
FIG. 7 is a cross-sectional elevational view taken generally on line 7—7 of FIG. 6.
Figure 8:
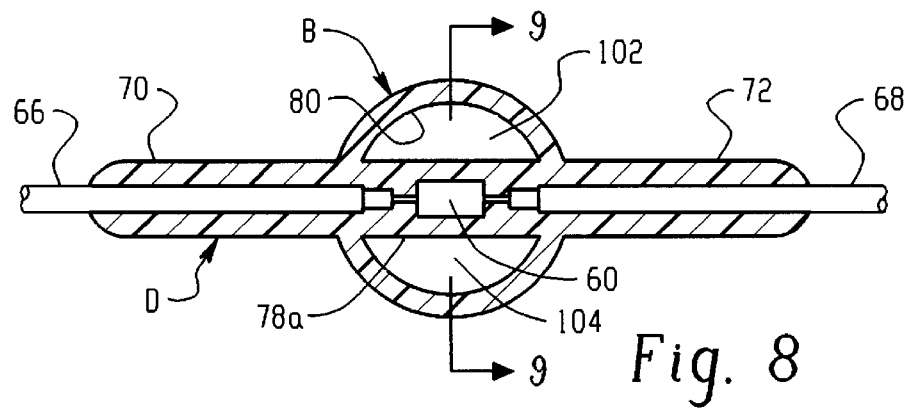
FIG. 8 is a cross-sectional elevational view taken generally on line 8—8 of FIG. 5.

As best shown in FIG. 9, stream divider 78a has knife edges 90 and 92 that face toward ends 82 and 84 of fitting B. Thus, fitting B is bidirectional and can be installed with either end facing toward the mixing chamber. Knife edges 90 and 92 are located in a plane that bisects cylindrical passage 80 longitudinally. Stream divider 78a curves from knife edges 90 and 92 toward the outwardly curved midpoints 94 and 96 of the divider that are on the diameter of a cylinder having approximately the same diameter as generally cylindrical end portions 70 and 72. As shown in FIGS. 7 and 8, stream divider 78a divides passage 80 into a pair of passages 102 and 104 that together have a combined cross-sectional area that is between 35–65% of the cross-sectional area of passage 80, and more preferably between 40–60% of the cross-sectional area of passage 80.

A liquid stream flowing through passage 80 and fitting B is split by a knife edge 90 or 92 into two streams that flow through smaller areas 102 and 104 to rejoin into one stream on the opposite side of the stream divider. Thermistor 60 is in intimate contact with the flowing liquid for accurate temperature sensing to modulate or cycle at least the hot water valve and maintain a more accurate temperature for the warm water supplied to receptacle A. The airfoil shape of the stream divider minimizes turbulent flow so that the water remains in contact with the outer surfaces of the stream divider for better heat transfer to the thermistor.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. An apparatus for sensing the temperature of a flowing liquid comprising a fitting molded from a plastic material and having a liquid flow passage therethrough, a temperature sensor molded into said fitting in a position extending across said passage internally of said fitting, said temperature sensor being positioned for splitting a single liquid stream flowing through said passage into two liquid streams as the liquid stream flows past said temperature sensor.

2. The apparatus of claim 1 wherein said temperature sensor is positioned for splitting a single liquid stream flowing through said passage into two liquid streams having substantially the same cross-sectional area.

3. The apparatus of claim 1 wherein said temperature sensor has opposite electrical leads projecting externally of said fitting.

4. The apparatus of claim 1 wherein said passage is cylindrical and has a longitudinal axis, and said temperature sensor being positioned in intersection with said longitudinal axis.

5. The apparatus of claim 1 wherein said passage has opposite ends and said temperature sensor is positioned substantially midway between said opposite ends.

6. The apparatus of claim 1 wherein said passage has a passage cross-sectional area and said temperature sensor divides said passages into a pair of passages having a combined cross-sectional area that is between 35–65% of said passage cross-sectional area.

7. The apparatus of claim 1 wherein said temperature sensor comprises a thermistor.

8. The apparatus of claim 1 wherein said temperature sensor is encapsulated in plastic that has a cross-sectional profile for minimizing turbulent flow therepast.

9. The apparatus of claim 8 wherein said cross-sectional profile includes a leading edge that faces upstream of liquid flow and has a substantially knife edged shape.

10. A molded temperature sensing hose fitting comprising a substantially cylindrical plastic body having a cylindrical liquid flow passage therethrough, said passage having a longitudinal axis and a passage diameter, a plastic stream divider molded into said fitting and extending across said passage of said fitting to divide said cylindrical passage into a pair of passages that extend past said divider, and a temperature sensor encapsulated in said stream divider.

11. The fitting of claim 10 wherein said plastic stream divider extends substantially diametrically of said passage.

12. The fitting of claim 10 wherein said pair of passages together have an area that is between 40–60% of the area of said passage.

13. The fitting of claim 10 wherein said temperature sensor has opposite electrical terminals thereon projecting externally of said fitting.

14. The fitting of claim 10 wherein said cross-sectional profile includes a leading edge that faces upstream of liquid flow and has a substantially knife edged shape.

15. In a clothes washing machine having a tub to which water is supplied through electrically operated hot and cold water valves, said machine including an electronic control having a warm water setting in which both of the hot and cold water valves are opened to supply warm water to the tub, said machine including a molded plastic fitting between said tub and said valves, said fitting having a flow passage through which water flows from said valves to said tub, a molded plastic stream divider molded into said fitting and extending across said passage to divide a single stream flowing through said passage into two streams that flow past said stream divider, said stream divider having a cross sectional profile that minimizes turbulent flow therepast, a thermistor encapsulated in said stream divider and connected with said control to provide feedback signals related to water temperature, said control being responsive to said feedback signals to modulate at least said hot water valve and regulate the temperature of mixed hot and cold water flowing through said passage in said fitting.

* * * * *